United States Patent
Nesterenko et al.

(10) Patent No.: US 7,614,757 B2
(45) Date of Patent: Nov. 10, 2009

(54) BACKLIGHT UNIT USING WIRE-GRID POLARIZER AND LIQUID CRYSTAL DISPLAY APPARATUS EMPLOYING THE BACKLIGHT UNIT

(75) Inventors: Dmitry Nesterenko, Suwon-si (KR); Hwan-young Choi, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 246 days.

(21) Appl. No.: 11/349,170

(22) Filed: Feb. 8, 2006

(65) Prior Publication Data
US 2007/0047214 A1 Mar. 1, 2007

(30) Foreign Application Priority Data
Aug. 30, 2005 (KR) .................. 10-2005-0079989

(51) Int. Cl.
*F21V 9/14* (2006.01)
*F21V 7/04* (2006.01)
*G02B 5/30* (2006.01)

(52) U.S. Cl. .................. 362/19; 362/606; 362/618; 362/625; 359/486

(58) Field of Classification Search .................. 362/19, 362/606, 609, 618, 623, 627, 617, 625, 626; 359/486
See application file for complete search history.

(56) References Cited

U.S. PATENT DOCUMENTS

| | | | | |
|---|---|---|---|---|
| 5,729,311 A | * | 3/1998 | Broer et al. | 349/65 |
| 5,751,388 A | * | 5/1998 | Larson | 349/96 |
| 6,011,602 A | * | 1/2000 | Miyashita et al. | 349/65 |
| 6,288,840 B1 | * | 9/2001 | Perkins et al. | 359/486 |
| 6,712,482 B2 | * | 3/2004 | Kawakami et al. | 362/623 |
| 2003/0210369 A1 | * | 11/2003 | Wu | 349/114 |
| 2005/0078374 A1 | * | 4/2005 | Taira et al. | 359/569 |

FOREIGN PATENT DOCUMENTS

WO WO 02/054119 A 8/2003

* cited by examiner

*Primary Examiner*—Alan Cariaso
(74) *Attorney, Agent, or Firm*—Sughrue Mion, PLLC

(57) ABSTRACT

A backlight unit, which can emit one of s-polarized light and p-polarized light using wire-grid polarizer, and a liquid crystal display apparatus employing the backlight unit are provided. The backlight unit includes: a light source radiating light; a light guide plate disposed with the light source at a lateral side of the light guide plate, guiding the light incident on the lateral side from the light source; a wire-grid polarizer formed on a predetermined layer of the light guide plate transmitting a first polarized component of the light through the predetermined layer and reflecting a second polarized component of light; a reflector reflecting the light to un upper surface of the light guide plate; and a polarization converter changing a polarization of the light not emitted through the upper surface of the light guide plate.

20 Claims, 8 Drawing Sheets

BACKLIGHT UNIT USING WIRE-GRID POLARIZER AND LIQUID CRYSTAL DISPLAY APPARATUS EMPLOYING THE BACKLIGHT UNIT

CROSS-REFERENCE TO RELATED PATENT APPLICATION

This application claims priority from Korean Patent Application No. 10-2005-0079989, filed on Aug. 30, 2005, in the Korean Intellectual Property Office, the disclosure of which is incorporated herein in its entirety by reference.

BACKGROUND OF THE INVENTION

1. Field of the Invention

Apparatuses and methods consistent with the present invention relate to a backlight unit and a liquid crystal display (LCD) apparatus, and more in particular, to a backlight unit in which one of s-polarized light or p-polarized light can be emitted by using wire-grid polarizer and an LCD apparatus employing the backlight unit.

2. Description of the Related Art

FIG. 1 illustrates a conventional liquid crystal display (LCD) apparatus. Referring to FIG. 1, the LCD apparatus includes an LCD panel 10 and a backlight unit 20 installed on a rear substrate of the LCD panel 10 to radiate light to the LCD panel 10. The LCD itself does not generate light and thus the backlight unit 10 provides light to produce an image. The LCD panel 10 includes a liquid crystal layer 13, transparent electrodes 12 and 14 controlling the orientation of the liquid crystal of the liquid crystal layer 13, and rear and front polarization panels 11 and 15 converting the incident light into polarized light polarized in a predetermined direction. In such a configuration, the light emitted from the backlight unit 20 is polarized in a particular direction by the rear polarization panel 11 and passes through the liquid crystal layer 13. When passing through the liquid crystal layer 13, the direction of polarization of the light is changed or not changed according to the voltage applied to the transparent electrodes 12 and 14, and the light passes through the front polarization panel 15 or is blocked by the front polarization panel 15. Thus, the pixels of the LCD apparatus are respectively turned on or off to produce an image.

FIGS. 2A and 2B are cross-sectional views of examples of the backlight unit 20. Referring to FIG. 2A, the backlight unit 20 can include a light guide plate 22 having a hologram pattern on its upper surface, a light source 21 placed at a lateral side of the light guide plate 22, and reflection panels 24 and 23 respectively placed on the lower surface and on an opposite lateral side of the light guide plate 22. Referring to FIG. 2B, the backlight unit 20 can include a light guide plate 25 with a sloped lower surface, a light source 21 placed at a lateral side of the light guide plate 25 and a reflection panel 24 attached to the lower surface of the light guide plate 25. In the backlight unit in FIG. 2A, light emitted from the light source 21 to the upper surface of the light guide plate 22 is diffracted by the hologram pattern to be emitted almost vertically, and light emitted to the lower surface of the light guide plate 22 is reflected by the reflection panel 24 and is incident on the upper surface of the light guide plate 22. In the backlight unit in FIG. 2B, light incident on the light guide plate 25 is emitted at an angle through the upper surface of the light guide plate 25 and reflected from the lower surface of the light guide plate 25 and proceeds to the upper surface of the light guide plate 25.

However, in the conventional backlight unit 20, since almost equal amounts of p-polarized light and s-polarized light are mixed and emitted, only half of the light emitted from the backlight unit is transmitted in the rear polarization panel 11 and the other half of the light is absorbed. Accordingly, the efficiency is low, and heat is generated as light is absorbed in the rear polarization panel 11. Also, there is a limit to the increase in the brightness of the LCD apparatus.

To solve these problems, the use of a dichroic polarizer sheet to emit a light having the same polarization direction as the rear polarization panel have been proposed. However, when a dichroic polarizer sheet is used, efficiency varies according to the incident angle and the wavelength of the light and light is still absorbed. A dual brightness enhancement film (DBEF) is highly efficient in that polarized light, which is not transmitted, is reflected and recycled. However, the cost is high and additional manufacturing processing is needed for the DBEF to be attached to the backlight unit.

U.S. Patent Publication No. 2003/0210369 discloses an LCD apparatus, shown in FIGS. 3A and 3B, in which brightness is improved by using a wire-grid polarizer. Referring to FIGS. 3A and 3B, the LCD apparatus includes a wire-grid polarizer 16 on a portion of a lower electrode 12.

The wire-grid polarizer 16 is made of thin metal wires disposed at regular intervals. The wire-grid polarizer 16 acts like a diffraction lattice when the distance between the metal wires is greater than the wavelength light, and acts like a polarizer when the distance between the metal wires is less than the wavelength of light. When acting like a polarizer, polarized light parallel to the metal wires, that is, s-polarized light, is reflected and polarized light perpendicular to the metal wires, that is, the p-polarized light, is transmitted.

According to the operation of the LCD apparatus disclosed in US Patent Publication No. 2003/0210369, referring to FIG. 3A, when a liquid crystal layer 13 is turned off, light emitted from a backlight unit passes through a rear polarization panel 11 and the liquid crystal layer 13 and is blocked by a front polarization panel 15. Also, external light passes through the front polarization panel 15, the liquid crystal layer 13, and the wire-grid polarizer 16, and is blocked by the rear polarization panel 11. On the other hand, referring to FIG. 3B, when the liquid crystal layer 13 is turned on, the light emitted from the backlight unit passes through the front polarization panel 15 and is emitted to the outside. On the other hand, external light passes through the front polarization panel 15, and is reflected by the wire-grid polarizer 16 as the polarization is changed by the liquid crystal layer 13, the polarization of the reflected light is changed again by the liquid crystal layer 13 and the light is emitted to the outside through the front polarization panel 15. Accordingly, not only the light emitted from the backlight unit but also the external light can be used, thereby improving brightness.

However, the brightness of the LCD apparatus cannot be improved without external light, and additional manufacturing process is needed to form the wire-grid polarizer when manufacturing LCD panels. Also, since the structure of the backlight unit is the same as in other conventional LCD panels, light is still absorbed by the rear polarization panel 11.

Accordingly, a backlight unit, which can be manufactured at low costs in a simple way without changing the structure of an LCD panel, which is relatively costly, and efficiently emit light of a particular polarization is needed.

SUMMARY OF THE INVENTION

The present invention provides a backlight unit which can emit s-polarized light or p-polarized light efficiently and without loss using a wire-grid polarizer.

The present invention also provides an LCD apparatus employing a backlight unit using a wire-grid polarizer.

According to an aspect of the present invention, there is provided a backlight unit comprising: a light source radiating light; a light guide plate disposed with the light source at a lateral side of the light guide plate and guiding the light incident on the lateral side into the light guide plate; a wire-grid polarizer, formed on a predetermined layer of the light guide plate, transmitting a first polarized component of the light through the predetermined layer and reflecting a second polarized component of the light; a reflector reflecting the light to an upper surface of the light guide plate; and a polarization converter changing a polarization of the light which is not emitted through the upper surface of the light guide plate. Here, the predetermined layer comprises at least one of the upper surface and a lower surface of the light guide plate.

According to another aspect of the present invention, the reflector comprises a lower reflection panel disposed below the light guide plate. Further, a lateral reflection panel may be disposed at an opposite lateral side of the light guide plate to reflect light which is emitted through the opposite lateral side of the light guide plate, and not through the upper surface of the light guide plate, to the light guide plate.

According to still another aspect of the present invention, the polarization converter may be placed between the opposite lateral side of the light guide plate and the lateral reflection panel. The polarization converter may also be placed between the lower surface of the light guide plate and the lower reflection panel. The polarization converter may be also a diffuse reflection panel facing the second lateral side of the light guide plate.

According to still another aspect of the present invention, the wire-grid polarizer comprising a plurality of parallel wires may be placed side by side with an interval of 200 nm or greater and functions as a diffraction lattice diffracting the light incident on the upper surface of the light guide plate.

According to still another aspect of the present invention, a micro-structured pattern may be formed on the upper or lower surface of the light guide plate, which changes a proceeding direction of the light incident on the micro-structured pattern to be substantially vertical. The micro-structured pattern may be a hologram diffraction pattern. The micro-structured pattern may be also a prism pattern.

According to still another aspect of the present invention, a coating layer may be formed on the micro-structured pattern which is formed on the upper surface of the light guide plate, wherein the wire-grid polarizer may be formed on the coating layer.

According to still another aspect of the present invention, there is provided an LCD apparatus including an LCD panel and a backlight unit installed on a rear surface of the LCD panel to illuminate the LCD panel, the backlight unit comprising: a light source radiating light; a light guide plate disposed with the light source at a lateral side of the light guide plate and guiding the light incident on the lateral side into the light guide plate; a wire-grid polarizer formed on a predetermined layer of the light guide plate, transmitting a first polarized component of the light through the predetermined layer and reflecting a second polarized component of the light; a reflector reflecting the light to an upper surface of the light guide plate; and a polarization converter changing a polarization of the light which is not emitted through the upper surface of the light guide plate. Here, the predetermined layer comprises at least one of the upper surface and a lower surface of the light guide plate.

According to still another aspect of the present invention, there is provided a method for generating a backlight comprising: guiding light into a light guide plate from a lateral side to an opposite lateral side of the light guide plate; transmitting a first component of the light through a predetermined layer of the light guide plate and reflecting a second polarized component of the light; reflecting the light, emitted through a lower surface of the light guide plate, to the light guide plate; and changing a polarization of the light not emitted through an upper surface of the light guide plate so that the light with a changed polarization is emitted through the upper surface of the light guide plate.

The method for generating backlight may further comprise reflecting the light, emitted through the opposite lateral side of the light guide plate, to the light guide plate.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF EXEMPLARY EMBODIMENTS

Figure 4A:
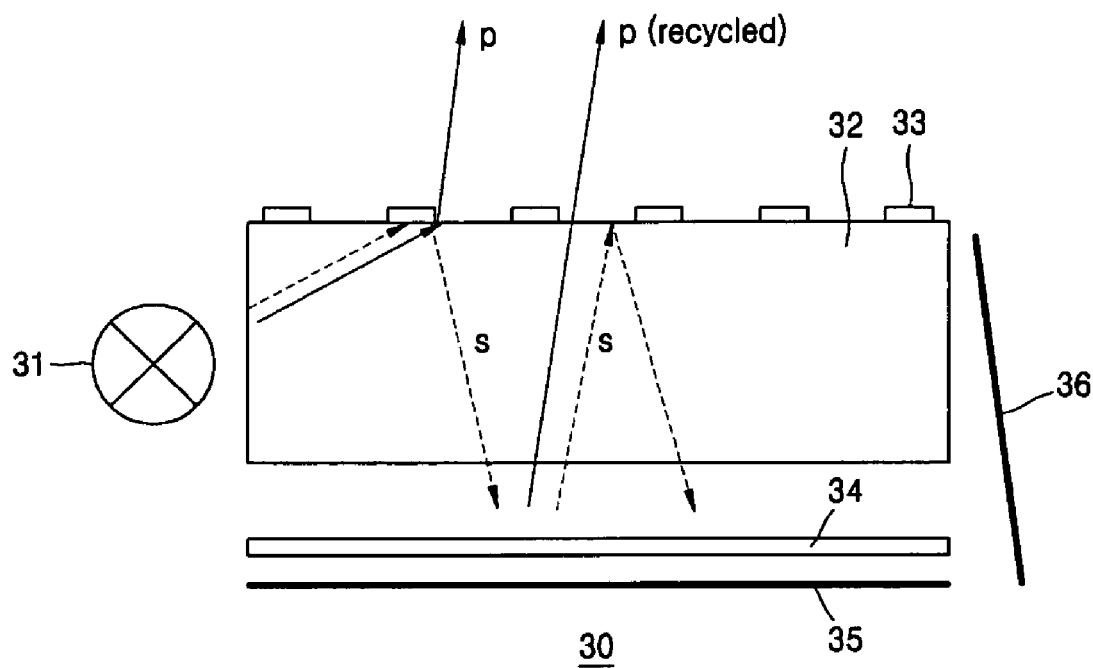
FIGS. 4A and 4B are cross-sectional views of a backlight unit using wire-grid polarizer according to an exemplary embodiment of the present invention.

FIG. 4A is a cross-sectional view of a backlight unit 30 to using a wire-grid polarizer 33 according to an exemplary embodiment of the present invention. Referring to FIG. 4A, the backlight unit 30 includes a light source 31 placed at a side of a light guide plate 32, a wire-grid polarizer 33 formed on the upper surface of the light guide plate 32, and a polarization converter 34 and a lower reflection panel 35 placed below the light guide plate 32. The light source 31 may be a point light sources such as a light emitting diode (LED) or a linear light source such as a cold cathode fluorescent lamp (CCFL). The light guide plate 32 can be formed of a plastic with a high light transmittance such as polymethyl methacrylate (PMMA).

Light is emitted from the light source 31 at a predetermined angle, is incident on a side of the light guide plate 32 and proceeds inside the light guide plate 32. Since the light guide plate 32 has a high refractive index and a high light-transmittance, portions of the light which are incident at angles on the upper and lower surfaces of the light guide plate 32 are totally reflected and proceed to the other side of the light guide plate 32. A portion of the light which is incident on a side of the light guide plate 32 almost perpendicularly proceeds directly to the other side of the light guide plate 32.

Figure 2A:
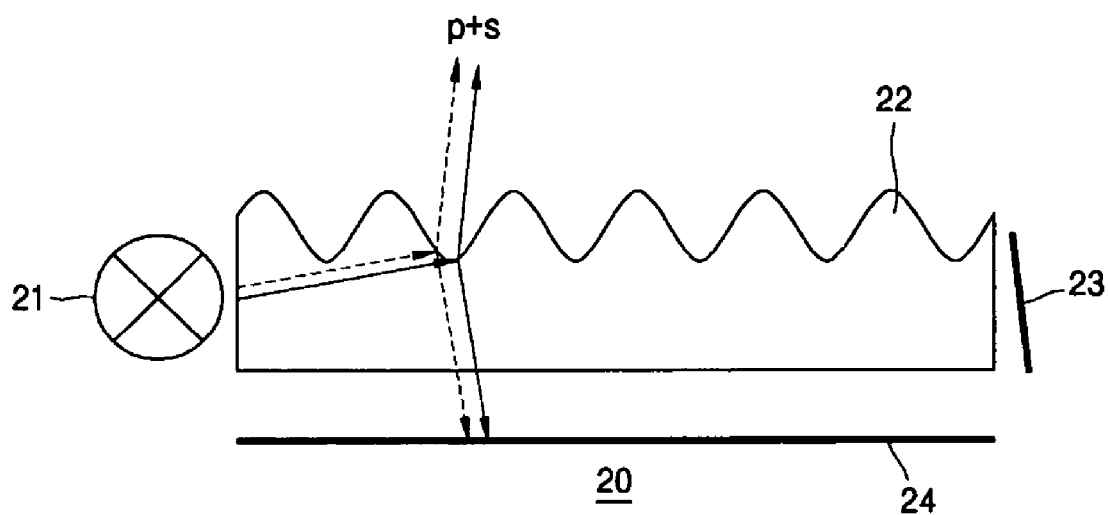
FIGS. 2A and 2B are cross-sectional views of examples of a backlight unit of the LCD apparatus of FIG. 1.
Figure 2B:
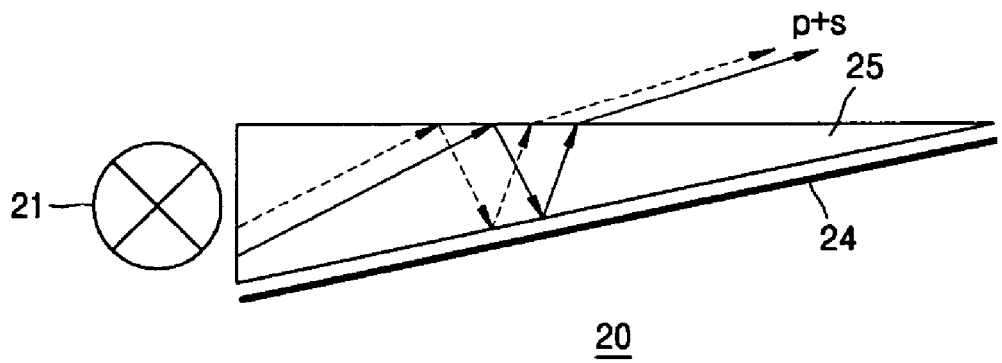
Figure 3A:
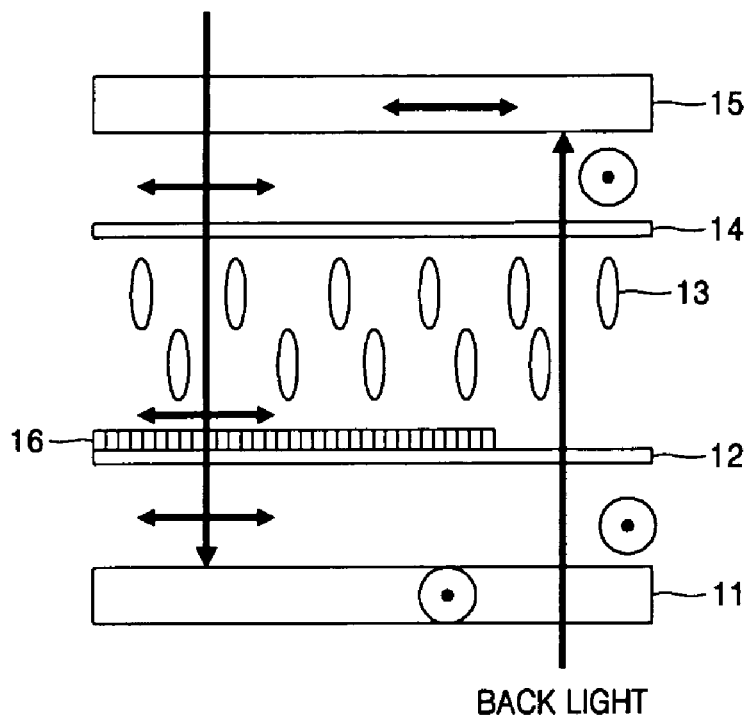
FIGS. 3A and 3B are cross-sectional views of a conventional LCD apparatus using a wire-grid polarizer.
Figure 3B:
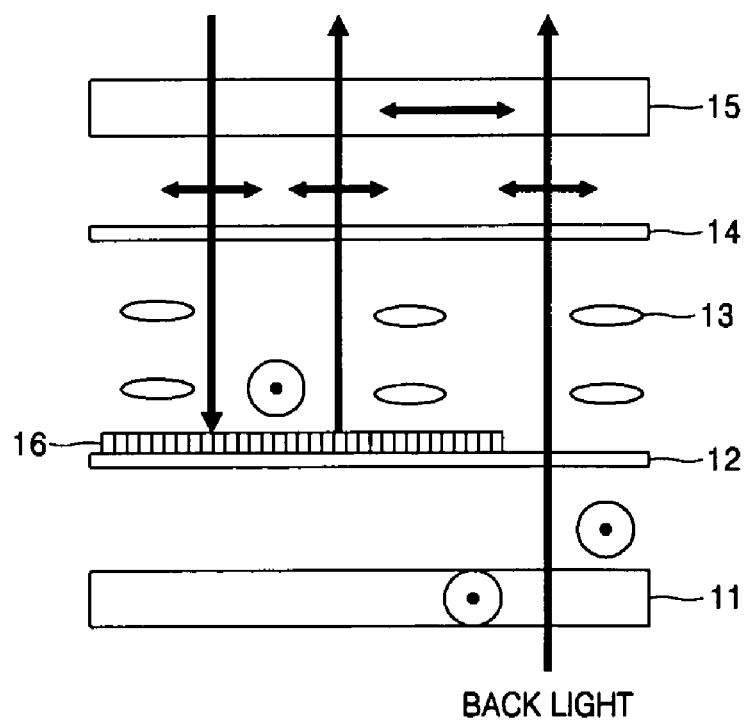

A hologram pattern is formed on the upper surface of the conventional light guide plate in FIG. 2A, and a portion of the light incident on the upper surface of the light guide plate is diffracted by the hologram pattern and emitted almost perpendicularly to the upper surface of the light guide plate. In the present exemplary embodiment, as shown in FIG. 4A, the wire-grid polarizer 33 are formed on the upper surface of the light guide plate 32, instead of a hologram pattern. The wire-grid polarizer 33 is parallel metal wires placed side by side regular intervals, and reflect s-polarized light which is parallel to the metal wires and transmit p-polarized light perpendicular to the metal wires.

Figure 5A:
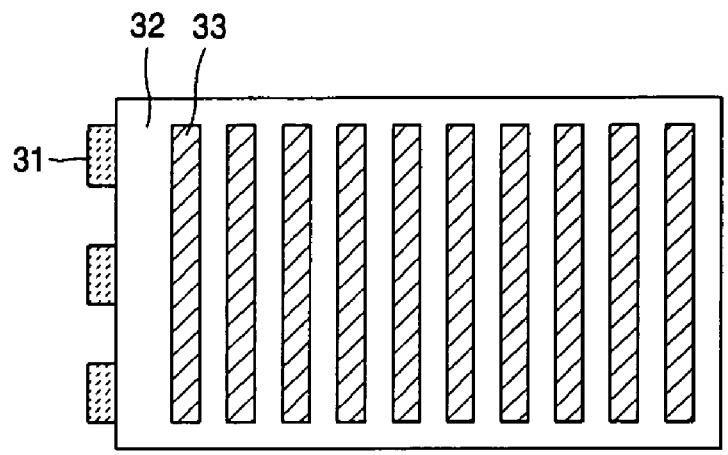
FIGS. 5A through 5C are plan views illustrating various placements of the wire-grid polarizer in the backlight unit according to exemplary embodiments of the present invention.
Figure 5B:
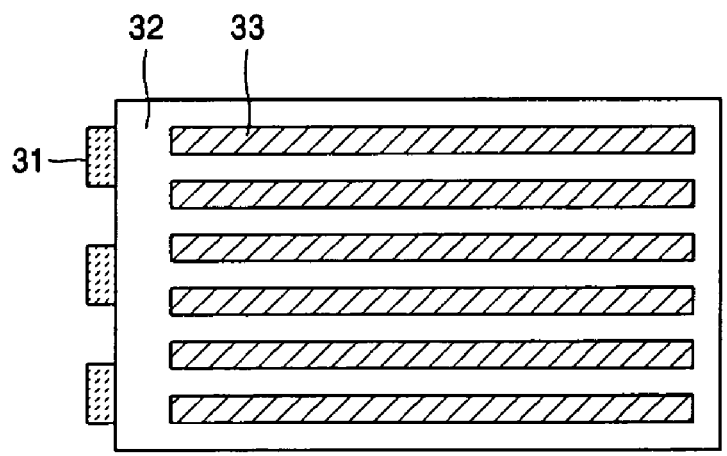
Figure 5C:
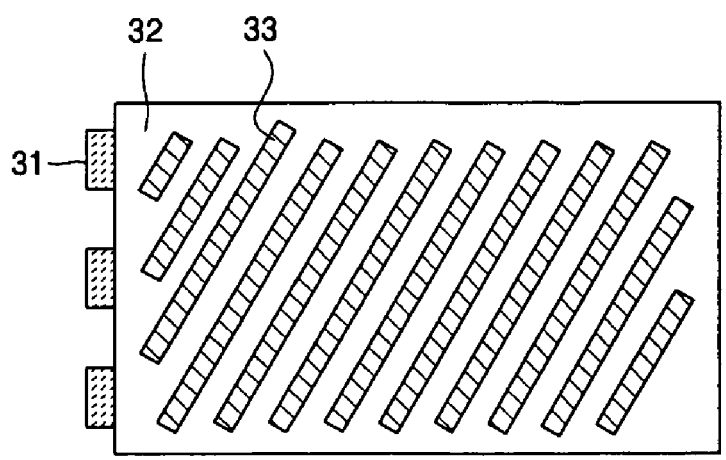

FIGS. 5A through 5C are plain views illustrating various arrangements of the wire-grid polarizer 33 of the backlight unit 30 according to exemplary embodiments of the present invention. Referring to FIGS. 5A through 5C, the metal wires forming the wire-grid polarizer 33 may be placed perpendicularly, horizontally, or sloped at a predetermined angle to the light path, according to the polarization direction of light transmitted by the rear polarization panel of the LCD apparatus. As described above, with predetermined interval between the metal wires, the wire-grid polarizer 33 can have the characteristics of both a diffraction lattice and a polarizer at the same time, depending on the wavelength of the light. For example, when the interval of the metal wires is greater than 200 nm, the wire-grid polarizer 33 may have the diffraction characteristics for visible light.

Accordingly, when the period of the metal wires is greater than 200 nm, as shown in FIG. 4A, p-polarized light among the light incident on the upper surface of the light guide plate 32 is diffracted and transmitted by the wire-grid polarizer 33, and can be emitted almost vertically. The s-polarized light, however, is reflected by the wire-grid polarizer 33 and proceeds to the lower surface of the light guide plate 32 to be emitted through the lower surface of the light guide plate 32. The light emitted to the lower surface of the light guide plate 32 passes through the polarization converter 34 and is reflected by the lower reflection panel 35, and then passes through the polarization converter 34 to be incident again on the lower surface of the light guide plate 32.

At this time, s-polarized light is changed into p-polarized light by the polarization converter 34. The polarization converter 34 may be a ¼ wave plate, for example. A ¼ wave plate is an optical device which delays the phase of light by one fourth of the wavelength of the light. The s-polarized light passes through the ¼ wave plate twice, resulting in the phase of the s-polarized light being delayed by one half of the wavelength and changing into p-polarized light. Thus, the light which is reflected by the lower reflection panel 35 and incident again on the lower surface of the light guide plate 32 is changed into p-polarized light. The light which is changed into p-polarized light and incident again on the lower surface of the light guide plate 32 is then incident on the upper surface of the light guide plate 32 and passes through the wire-grid polarizer 33 to be emitted.

Consequently, in the present exemplary embodiment, most of the light emitted through the upper surface of the light guide plate 32 is p-polarized. For example, the backlight unit 30 provides light which is highly polarized such that the amount of p-polarized light is 150 to 1000 times as much as that of s-polarized light.

Moreover, in the backlight unit 30, p-polarized light is emitted and s-polarized light is reflected, and then the reflected s-polarized light is changed into a p-polarized light. Thus, light emitted from the light source 31 can be emitted to the outside as particularly polarized without light absorption or loss. Accordingly, brightness is improved in the backlight unit 30 of the present exemplary embodiment.

Among the light incident through a lateral side of the light guide plate 32 and proceeding inside the light guide plate, a portion of the light which is not emitted through the upper surface of the light guide plate 32 is finally emitted to the other lateral side of the light guide plate 32. The light emitted to the other lateral of the light guide plate 32 can be recycled since a lateral reflection panel 36 is installed at the other lateral side of the light guide plate 32. Referring to 4A, when the lateral reflection panel 36 is sloped slightly, the reflected light is totally reflected onto the lower and upper surfaces of the light guide plate 32 and proceeds inside the light guide plate 32 and most of the light can be emitted through the upper surface of the light guide plate 32.

Figure 4B:
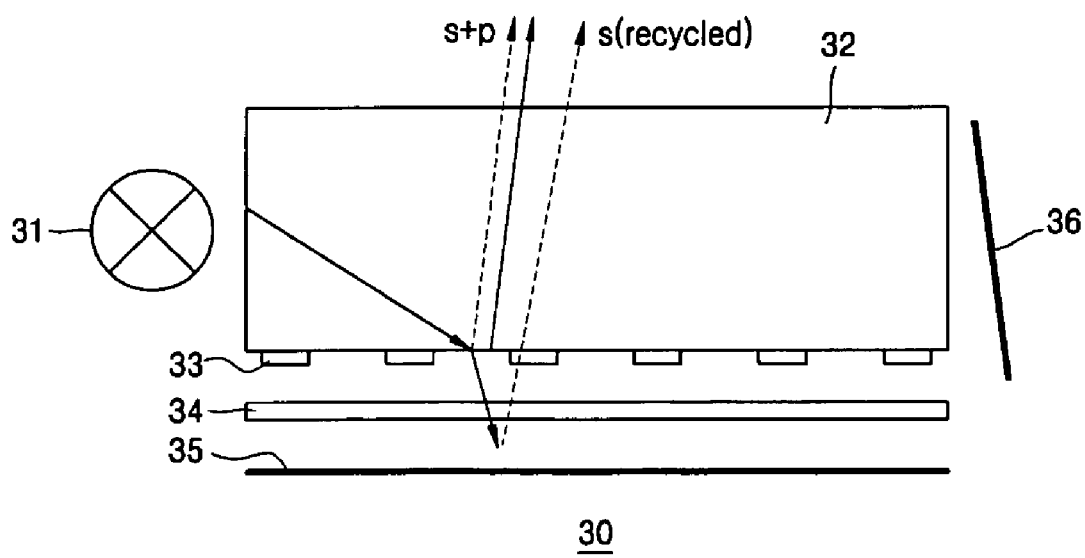

In the backlight unit shown in FIG. 4A, the wire-grid polarizer 33 are formed on the upper surface of the light guide plate 32 so that p-polarized light can be emitted. Alternatively, referring to FIG. 4B, the wire-grid polarizer 33 can be formed on the lower surface of the light guide plate 32. Referring to FIG. 4B, in the backlight unit 30 of the present embodiment, the light source 31 is installed at a lateral of the light guide plate 32, and the wire-grid polarizer 33 is formed on the lower surface of the light guide plate 32, and the polarization converter 34 and the lower reflection panel 35 respectively face the lower surface of the light guide plate 32. The only difference between the backlight units of FIGS. 4A and 4B is that the backlight unit 30 in FIG. 4B includes the wire-grid polarizer 33 formed on the lower surface of the light guide plate 32.

In this configuration, a portion of the light emitted from the light source 31 and proceeding inside the light guide plate 32 is incident on the lower surface of the light guide pate 32. Among the light incident on the lower surface of the light guide plate 32, s-polarized light is reflected by the wire-grid polarizer 33 and emitted almost vertically through the upper surface of the light guide plate 32. P-polarized light is diffracted and transmitted almost vertically by the wire-grid polarizer 33 through the lower surface of the light guide plate 32. The p-polarized light emitted through the lower surface of the light guide plate 32 passes through the polarization converter 34 and is reflected by the lower reflection surface panel 35, and then passes through the polarization converter 34 and is incident on the lower surface of the light guide plate 32. At this time, the p-polarized light is changed into s-polarized light. When the wire-gird polarizer 33 has only the characteristics of a polarizer, the s-polarized light is reflected again by the wire-grid polarizer 33. When the period of the metal wires of the wire-grid polarizer is about 420 nm, s-polarized light can also partially pass through the wire-grid polarizer 33 and be emitted to the upper surface of the light guide plate 32. The rest of the s-polarized light is reflected by the wire-grid polarizer 33, passes through the polarization converter 34, is reflected by the lower reflection panel 35, passes through the polarization converter 34 again, and is incident on the lower surface of the light guide plate 32. At this time, the s-polarized light is changed into p-polarized light, passes through the wire-grid polarizer 33 and is emitted through the upper surface of the light guide plate 32.

Accordingly, in the backlight unit shown in FIG. 4B, not only s-polarized light but p-polarized light can also be emitted in part. Since a portion of the p-polarized light, which is transmitted by the wire-grid polarizer 33, is emitted through the upper surface of the light guide plate 32, and the rest is changed into s-polarized and emitted, the ratio of the s-polarized light to the p-polarized light can be maintained high.

Figure 6:
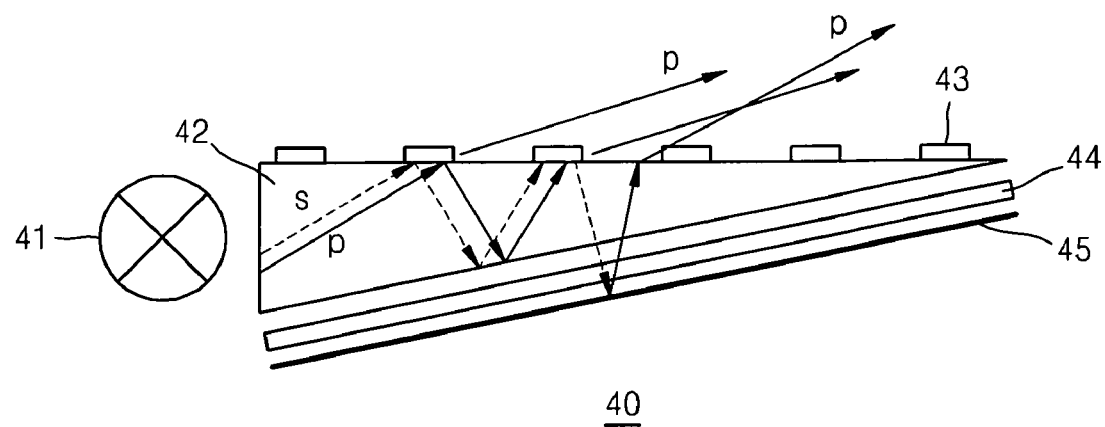
FIG. 6 is a cross-sectional view of a backlight unit using a wire-grid polarizer according to another exemplary embodiment of the present invention.

FIG. 6 is a cross-sectional view of a backlight unit 40 using wire-grid polarizer 43 according to another exemplary embodiment of the present invention. Referring to FIG. 6, the backlight unit 40 in the present exemplary embodiment includes a light source 41 placed at a lateral side of a light guide plate 42 which has a cross-section shaped like a right-angled triangle, the wire-grid polarizer 43 formed on the upper surface of the light guide plate 42, and a polarization converter 44 and a lower reflection panel 45 facing the lower surface of the light guide plate 42. The lower surface of the light guide plate 42 is sloped relative to the upper surface of the light guide plate 42. The cross-section of the light guide plate 42 is shaped like a right-angled triangle or a wedge in which the thickness decreases in the light proceeding direction. Also, in the present exemplary embodiment, the interval between metal wires of the wire-grid polarizer 43 may be less than 200 nm so that the wire-grid polarizer 43 acts only like a polarizer, not a diffraction lattice.

In such a configuration, the light incident on the lateral side of the light guide plate 42 is reflected at the upper and lower surfaces of the light guide plate 42. In the present exemplary embodiment, since the wire-grid polarizer 43 does not act like a diffraction lattice, when the light is incident on the upper surface of the light guide plate 42 at an angle greater than the critical angle, both s-polarized light and p-polarized light are totally reflected. Also, since the lower surface of the light guide plate 42 is sloped relative to the upper surface of the light guide plate 42, the incident angle of the light on the upper surface of the light guide plate 42 gradually decreases. When the incident angle on the upper surface of the light guide plate 42 is smaller than a critical angle, p-polarized light is transmitted by the wire-grid polarizer 43 and emitted. The s-polarized light, on the other hand, is reflected by the wire-grid polarizer 43 to the lower surface of the light guide plate 42.

The s-polarized light reflected to the lower surface of the light guide plate 42 is transmitted by the polarization converter 44, is reflected by the lower reflection panel 45, and passes through the polarization converter 44 again, and is incident on the lower surface of the light guide plate 42. At this time, s-polarized light is changed into p-polarized light. Accordingly, the light passes through the wire-grid polarizer 43 and is emitted.

In the present exemplary embodiment, since the metal wires has an interval less than about 200 nm, the wire-grid polarizer 43 does not act like a diffraction lattice and thus the ratio of p-polarized light to s-polarized light is high among the light emitted from the upper surface of the light guide plate 42.

Figure 7A:
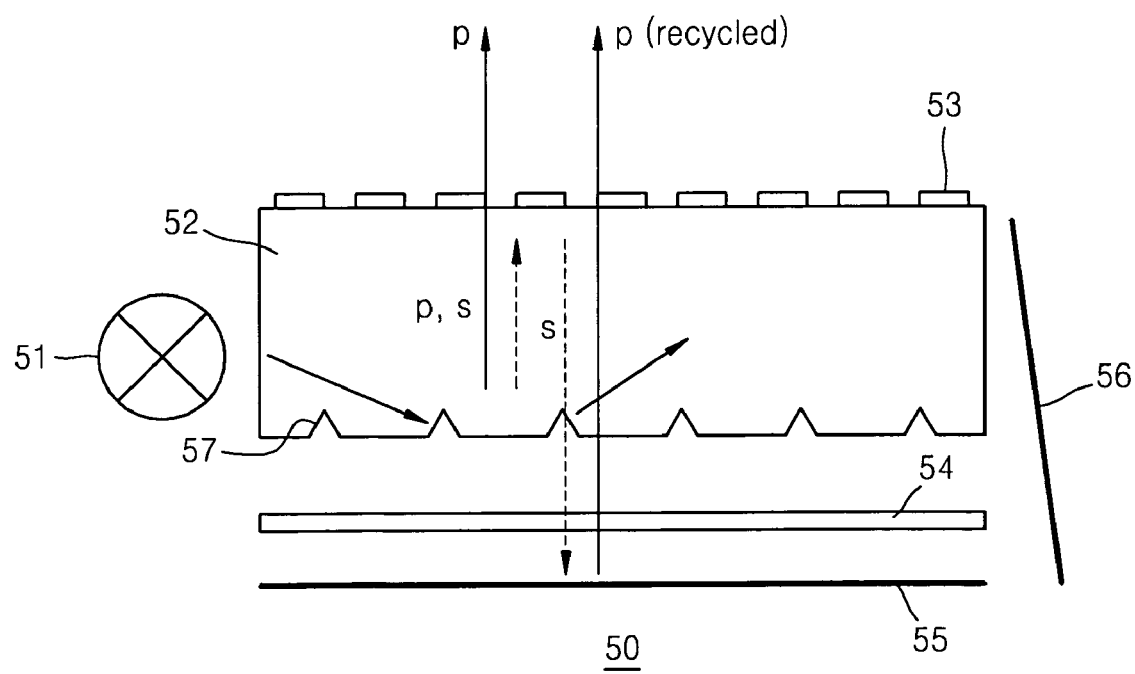
FIGS. 7A through 7C are cross-sectional views of backlight units using wire-grid polarizer according to other exemplary embodiments of the present invention.
Figure 7B:
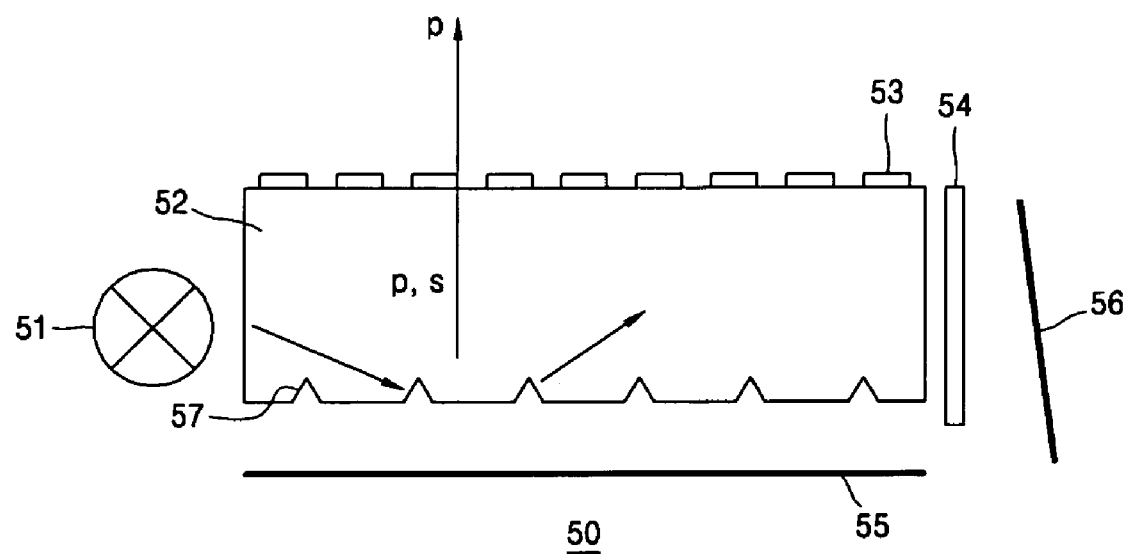
Figure 7C:
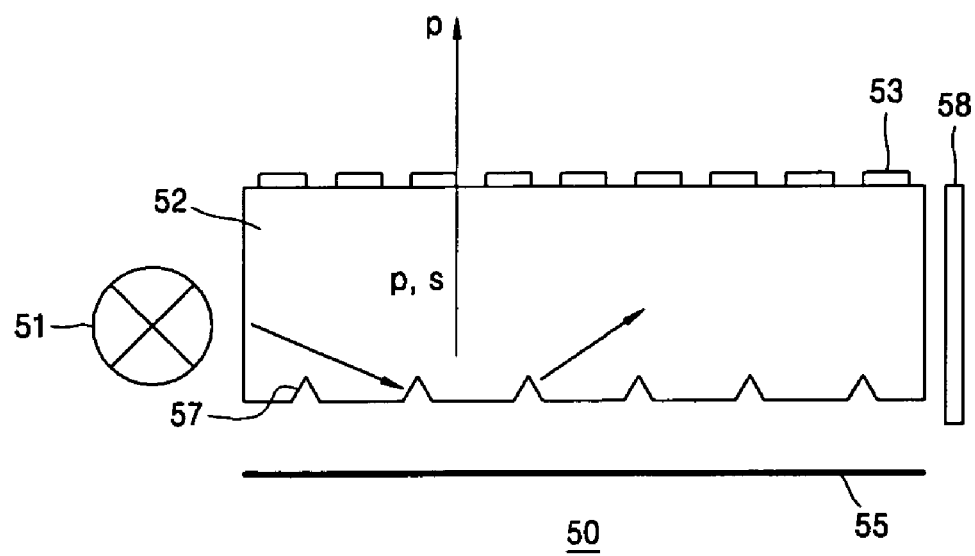

To emit the light vertically to the upper surface of the light guide plate and at the same time increase the ratio of p-polarized light to s-polarized light, the period of the metal wires may be less than 200 nm, and a micro-structured diffraction pattern can be formed on the lower surface of the light guide plate. FIGS. 7A through 7C are cross-sectional views of backlight units 30 using a wire-grid polarizer according to other exemplary embodiments of the present invention.

First, referring to FIG. 7A, the backlight unit 50 according to the present exemplary embodiment includes a light source 51 at a lateral side of a light guide plate 52 having a micro-structured pattern 57, a wire-grid polarizer 53 on the upper surface of the light guide plate 52 on a lower surface thereof, and a polarization converter 54 and a lower reflection panel 55 facing the lower surface of the light guide plate 52. Furthermore, a reflection panel 56 may be further included to recycle the light emitted to the other side of the light guide plate 52. The period of the metal wires may be less than about 200 nm so that the wire-grid polarizer 53 acts like a polarizer, not a diffraction lattice.

In such a configuration, light emitted from the light source 51 and incident on the lateral side of the light guide plate 52 proceeds inside the light guide plate 52. When the light is incident at an angle on the lower surface of the light guide plate 52 as the light proceeds inside the light guide plate 52, the light is refracted by the micro-structured pattern 57 formed on the lower surface of the light guide plate 52 and is vertically incident on the upper surface of the light guide plate 52. For example, the micro-structured pattern 57 may be a prism pattern as shown in FIG. 7A. Among the light vertically incident on the upper surface of the light guide plate 52, p-polarized light is transmitted by the wire-grid polarizer 53 and is emitted vertically, and s-polarized light is reflected by the wire-grid polarizer 53 to the lower surface of the light guide plate 52. The s-polarized light reflected to the lower surface of the light guide plate 52 passes through the polarization converter 54, which may be a ¼ wave length plate, is reflected by the lower reflection panel 55, passes through the polarization converter 54, and is incident on the lower surface of the light guide plate 52. At this time, the s-polarized light is changed into p-polarized light. Accordingly, the p-polarized light is transmitted by the wire-grid polarizer 53 and is emitted vertically.

Thus, the backlight unit 50 shown in FIG. 7A emits light vertically through the upper surface of the light guide plate 52 and at the same time increases the ratio of the p-polarized light to the s-polarized light among the emitted light, thus providing highly polarized light.

FIGS. 7B and 7C illustrate variations of the backlight unit 50 in FIG. 7A. In the backlight unit 50 in FIG. 7B, the polarization converter 54 is not between the lower surface of the light guide plate 52 and the lower reflection panel 55, but placed between the other lateral side of the light guide plate 52 and the lateral reflection panel 56. Accordingly, in the backlight unit in FIG. 7B, s-polarized light which is not emitted through the upper surface of the light guide plate 52 but to the other lateral side of the light guide plate 52 is changed into p-polarized light and enters on the other lateral side of the light guide plate 52. The p-polarized light proceeds inside the light guide plate 52 in the opposite direction and is emitted vertically to the upper surface of the light guide plate 52.

In the backlight unit 50 in FIG. 7C, the polarization converter 54 and the lateral reflection panel 56 in FIG. 7B are replaced with a diffuse reflector 58. The diffuse reflector 58 diffuses and reflects incident light in various directions, and its polarization changes into various directions as well. Accordingly, s-polarized light which is emitted from the light source 51 and incident on a lateral side of the light guide plate 52 and not emitted through the upper surface of the light guide plate 52 but emitted through the other lateral side of the light guide plate 52 is diffused at various angles by the diffuse reflector 58 and incident again on the other lateral side of the light guide plate 52. The polarization of the light which is incident again on the other lateral side of the light guide plate 52 is changed into various directions and the light includes not only s-polarized light but also p-polarized light. Among the light incident again on the other lateral of the light guide plate 52 and proceeding inside the light guide plate 52, p-polarized light is vertically emitted through the upper surface of the light guide plate 52.

Figure 8A:
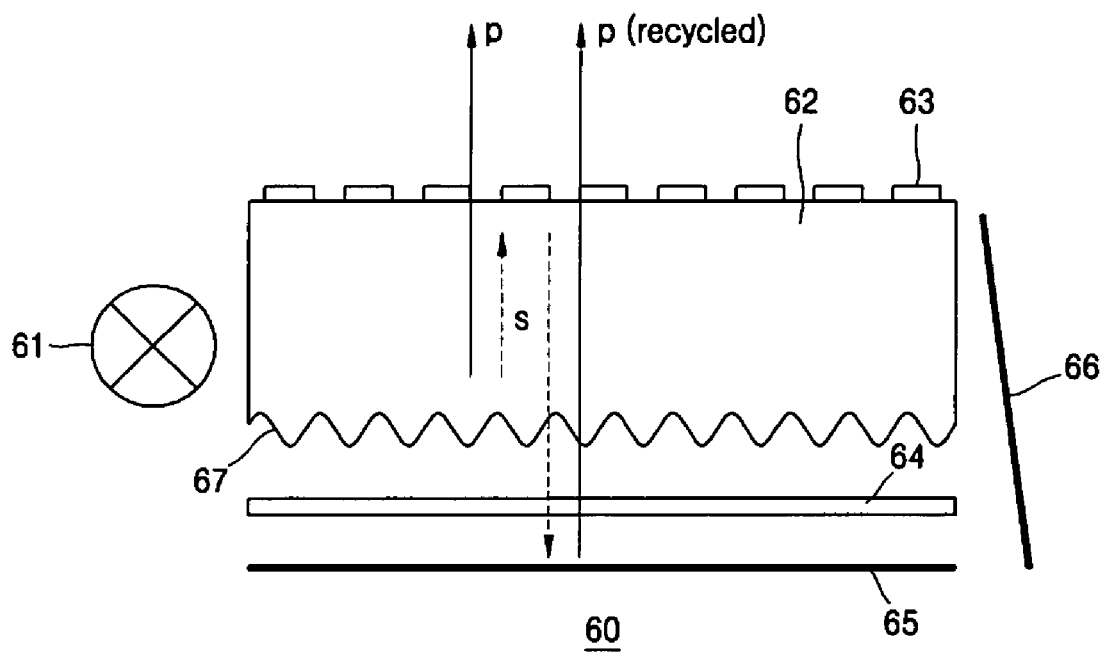
FIGS. 8A and 8B are cross-sectional views of backlight units using wire-grid polarizer according to other exemplary embodiments of the present invention.
Figure 8B:
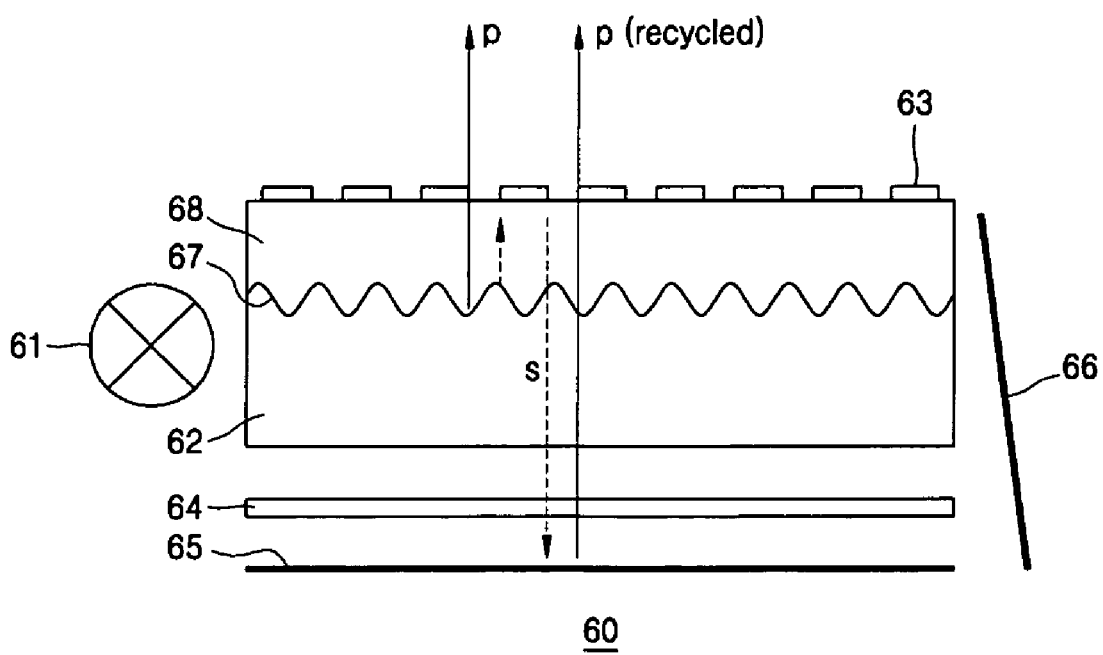

The backlight units 50 in FIGS. 7A through 7C use a prism pattern as a micro-structured pattern. Alternatively, a hologram can also be used for a diffraction pattern as shown in FIGS. 8A and 8B. A backlight unit 60 in FIG. 8A has the same structure as the backlight unit 50 in FIG. 7A, except that a hologram diffraction pattern is used as a micro-structured pattern 67 instead of a prism pattern. Accordingly, the backlight unit 60 in FIG. 8A operates in the same manner as the backlight unit 50 in FIG. 7A. Also, although not shown, the backlight unit 60 in FIG. 8A may be modified in the same manner as the backlight units 50 shown in FIGS. 7B and 7C. That is, a polarization converter 64 may not be placed between the lower surface of a light guide plate 62 and a lower reflection panel 65 but between the other lateral side of the light guide plate 62 and a lateral reflection panel 66. Also, the polarization converter 64 and the lateral reflection panel 66 placed on the other lateral side of the light guide plate 62 can be replaced with a diffuse reflector.

In the backlight unit in FIG. 8B, the micro-structured pattern 67 is formed on the upper surface of the light guide plate 62, not on the lower surface. Since wire-grid polarizer 63 cannot be formed on the curved micro-structured pattern 67, a transparent coating layer 68 having a planar upper surface is formed on the micro-structured pattern 67, and the wire-grid polarizer 63 are formed on the coating layer 68.

In such a configuration, light emitted from the light source 61 and incident on a lateral side of the light guide plate 62 is diffracted by the hologram diffraction pattern 67 formed on the upper surface of the light guide plate 62 and is vertically emitted through the upper surface of the light guide plate 62. Then the light passes through the transparent coating layer 68 and is incident on the wire-grid polarizer 63 formed on the upper surface of the coating layer 68. Among the light incident on the wire-grid polarizer 63, p-polarized light is transmitted by the wire-grid polarizer 63 vertically. S-polarized light, on the other hand, i,s reflected by the wire-grid polarizer 63 to the lower surface of the light guide plate 62. The s-polarized light reflected to the lower surface of the light guide plate 62 is transmitted by the polarization converter 64, is reflected by the lower reflection panel 65, passes through the polarization converter 64 again, and is incident on the lower surface of the light guide plate 62. During this process, the s-polarized light is changed into p-polarized light. Accordingly, the p-polarized light can transmit through the wire-grid polarizer 63.

Figure 1:
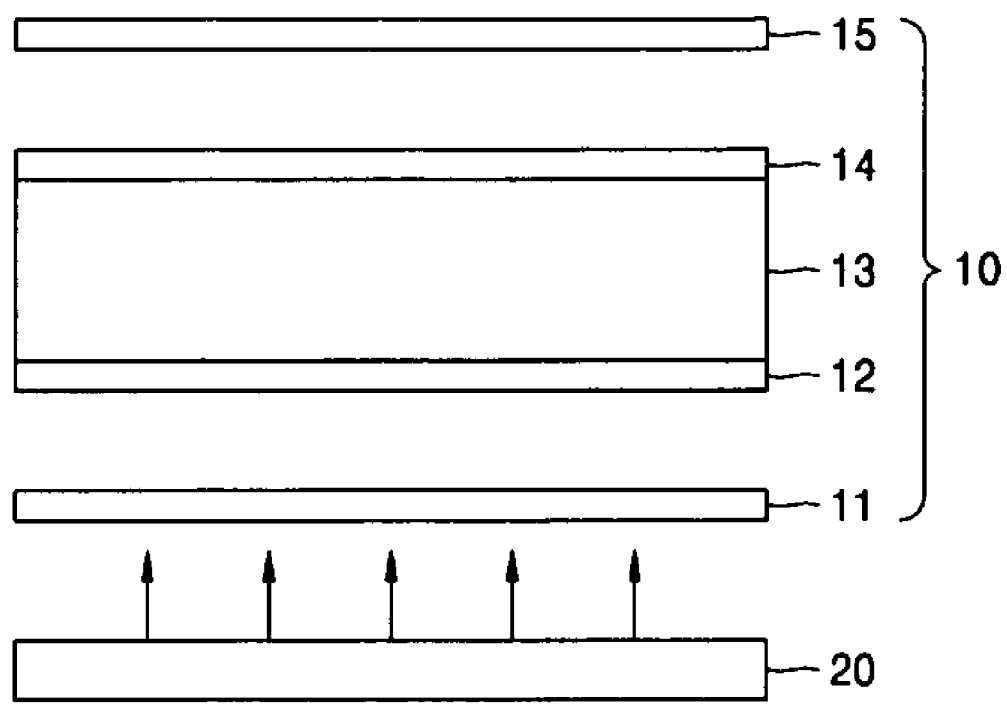
FIG. 1 is cross-sectional view of a conventional LCD apparatus.

The backlight unit according to various embodiments of the present invention can be employed in an LCD apparatus without changing the structure of an LCD panel. That is, a backlight unit of the present invention can be placed on the rear substrate of the LCD panel 10 in FIG. 1, thereby providing an LCD apparatus with high brightness in a simple way. The polarization of the light emitted from the backlight unit of the present invention and the polarization of the rear polarization panel 11 of the LCD panel 10 can be the same. As described with reference to FIGS. 5A through 5C, the polarization of the light emitted from the backlight unit can be adjusted by the orientation of the metal wires of the wire-grid polarizer.

As described above, the backlight unit according to the present invention emits s-polarized light or p-polarized light, reflects the other polarized light, and changes the polarization of the reflected light. Thus all the light emitted from the light source can have a certain polarization without light absorption or loss to the outside. Accordingly, most of the light emitted from the backlight unit transmitted from the rear polarization panel of the LCD apparatus and the brightness of the LCD apparatus is improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A backlight unit comprising:
    a light source which radiates light;
    a light guide plate, disposed with the light source positioned at a lateral side of the light guide plate, which guides the light incident on the lateral side into the light guide plate;
    a wire-grid polarizer, comprising a plurality of parallel metal wires formed on one of a top surface and a bottom surface of the light guide plate, which transmits a first polarized component of the light in a substantially perpendicular direction to the metal wires through the one of the top surface and the bottom surface of the light guide plate and reflects a second polarized component of the light in a substantially parallel direction to the metal wires;
    a reflector which is disposed below the light guide plate and reflects the light emitted out from the light guide plate to an inside of the light guide plate;
    a polarization converter which changes a polarization of the light not emitted through the top surface of the light guide plate into an opposite polarization; and
    a micro-structured pattern, formed on a surface of a given layer in the light guide plate, which changes a proceeding direction of the light incident on the micro-structured pattern to be substantially vertical to the top surface of the light guide plate,
    wherein the surface of the given layer, substantially parallel to the top surface of the light guide plate, is disposed apart from the top surface of the light guide plate, and
    wherein the given layer on which the micro-structured pattern is formed is the bottom layer of the light guide plate, and the wire-grid polarizer is formed on the top surface of the light guide plate.

2. The backlight unit of claim 1, further comprising a lateral reflection panel, disposed at an opposite lateral side of the light guide plate, which reflects the light, emitted through the opposite lateral side of the light guide plate to the inside of the light guide plate.

3. The backlight unit of claim 2, wherein the lateral reflection panel is sloped at a predetermined angle so that the portion of the light reflected to the inside of the light guide plate by the lateral reflection panel is totally reflected onto the bottom surface and the top surface of the light guide plate.

4. The backlight unit of claim 2, wherein the polarization converter is placed between the light guide plate and the lateral reflection panel.

5. The backlight unit of claim 1, wherein the polarization converter is placed between the bottom surface of the light guide plate and the reflector.

6. The backlight unit of claim 1,
    wherein the light guide plate is configured such that thickness of the light guide plate decreases from the lateral side, at which the light source is disposed, to the opposite lateral side; and wherein an interval between the parallel metal wires is less than 200 nm so that the wire-grid polarizer functions as only a polarizer.

7. The backlight unit of claim 1, wherein the polarization converter is a diffuse reflection panel disposed at an opposite lateral side of the light guide plate.

8. The backlight unit of claim 1,
wherein an interval between the parallel metal wires is 200 nm or greater, and the wire-grid polarizer further functions as a diffraction lattice to diffract the light incident on the one of the top surface and the bottom surface of the light guide plate on which the wire-grid polarizer is formed.

9. The backlight unit of claim 1, wherein the micro-structured pattern is a hologram diffraction pattern.

10. The backlight unit of claim 1, wherein the micro-structured pattern is a prism pattern.

11. The backlight unit of claim 1, wherein the reflector comprises a lower reflection panel disposed below the light guide.

12. The backlight unit of claim 1, flirt her comprising a coating layer,
formed between the top surface and the surface of the given layer in the light guide plate.

13. The backlight unit of claim 1, wherein the first and second polarized components of the light comprise p-polarization and s-polarization components, respectively.

14. The backlight unit of claim 1, the polarization converter comprises a ¼ wave plate which delays a phase of the light which passes through the polarization converter by one fourth of a wavelength of the light.

15. A liquid crystal display (LCD) apparatus including an LCD panel and a backlight unit installed on a rear surface of the LCD panel, the backlight unit comprising:
a light source which radiates light;
a light guide plate, disposed with the light source positioned at a lateral side of the light guide plate, which guides the light incident on the lateral side into the light guide plate;
a wire-grid polarizer, comprising a plurality of parallel metal wires formed on one of a top surface and a bottom surface of the light guide plate, which transmits a first polarized component of the light in a substantially perpendicular direction to the metal wires through the one of the top surface and the bottom surface of the light guide plate and reflects a second polarized component of the light in a substantially parallel direction to the metal wires;
a reflector which is disposed below the light guide plate and reflects the light emitted out from the light guide plate to an inside of the light guide plate;
a polarization converter which changes a polarization of the light not emitted through the top surface of the light guide plate into an opposite polarization; and
a micro-structured pattern, formed on a surface of a given layer in the light guide plate, which changes a proceeding direction of the light incident on the micro-structured pattern to be substantially vertical to the top surface of the light guide plate,
wherein the surface of the given layer, substantially parallel to the top surface of the light guide plate, is disposed apart from the top surface of the light guide plate, and
wherein the given layer on which the micro-structured pattern is formed is the bottom layer of the light guide plate, and the wire-grid polarizer is formed on the top surface of the light guide plate.

16. The LCD apparatus of claim 15, wherein an interval between the parallel metal wires is 200 nm or greater, and the wire-grid polarizer further functions as a diffraction lattice to diffract the light incident on the one of the top surface and the bottom surface of the light guide on which the wire-grid polarizer is formed.

17. The LCD apparatus of claim 15, further comprising a micro-structured pattern, formed on a predetermined layer of the light guide plate, which changes a proceeding direction of the light incident on the micro-structured pattern to be substantially vertical to the top surface of the light guide plate.

18. A method for generating a backlight, comprising:
guiding light into a light guide plate from a lateral side to an opposite lateral side of the light guide plate;
transmitting a first polarized component of the light in a substantially perpendicular direction to a plurality of parallel metal wires of a wire-grid polarizer through one of a top surface and a bottom surface of the light guide plate and reflecting a second polarized component of the light in a substantially parallel direction to the metal wires;
reflecting the light, emitted through the light guide plate to an inside of the light guide plate; and
changing a polarization of the light not emitted through a top surface of the light guide plate into an opposite polarization so that the light with a changed polarization is emitted through the top surface of the light guide plate,
wherein the transmitting and the reflecting are performed using a micro-structured pattern, formed on a surface of a given layer in the light guide plate, which changes a proceeding direction of the light incident on the micro-structured pattern to be substantially vertical to the top surface of the light guide plate, and
wherein the surface of the given layer, substantially parallel to the top surface of the light guide plate, is disposed apart from the top surface of the light guide plate, and
wherein the given layer on which the micro-structured pattern is formed is the bottom layer of the light guide plate, and the wire-grid polarizer is formed on the top surface of the light guide plate.

19. The method of claim 18, further comprising reflecting the light, emitted through the opposite lateral side of the light guide plate, to the inside of the light guide plate.

20. The method of claim 18, further comprising changing a proceeding direction of the light, incident on the one of the top surface and the bottom surface of the light guide plate from the lateral side of the light guide plate, to be substantially vertical, using a micro-structured pattern.

* * * * *